US008166152B1

(12) United States Patent
Delcheva et al.

(10) Patent No.: US 8,166,152 B1
(45) Date of Patent: *Apr. 24, 2012

(54) ARCHITECTURE AND METHOD FOR MONITORING SYSTEM RESOURCES WITHIN AN ENTERPRISE NETWORK

(75) Inventors: Sylvia J. Delcheva, Walldorf (DE); Gregor K. Frey, Lorsch (DE); Juergen Opgenorth, Heidelberg (DE); Miroslav R. Petrov, Sofia (BG)

(73) Assignee: SAP AG, Walldorf (DE)

( * ) Notice: Subject to any disclaimer, the term of this patent is extended or adjusted under 35 U.S.C. 154(b) by 925 days.

This patent is subject to a terminal disclaimer.

(21) Appl. No.: 10/749,086

(22) Filed: Dec. 30, 2003

(51) Int. Cl.
*G06F 15/173* (2006.01)

(52) U.S. Cl. ........ 709/224; 709/223; 709/225; 707/634; 707/636; 707/654; 719/316

(58) Field of Classification Search .................. 709/200, 709/201, 202; 707/10, 200, 204
See application file for complete search history.

(56) References Cited

U.S. PATENT DOCUMENTS

| | | | |
|---|---|---|---|
| 5,802,291 A | 9/1998 | Balick et al. | |
| 6,061,721 A * | 5/2000 | Ismael et al. | 709/223 |
| 6,066,181 A * | 5/2000 | DeMaster | 717/148 |
| 6,083,281 A | 7/2000 | Diec et al. | |
| 6,134,581 A * | 10/2000 | Ismael et al. | 709/202 |
| 6,144,967 A | 11/2000 | Nock | |
| 6,212,520 B1 | 4/2001 | Maruyama et al. | |
| 6,308,208 B1 * | 10/2001 | Jung et al. | 709/224 |
| 6,351,776 B1 * | 2/2002 | O'Brien et al. | 709/245 |
| 6,356,931 B2 * | 3/2002 | Ismael et al. | 709/202 |
| 6,427,228 B1 | 7/2002 | Wigger | |
| 6,539,501 B1 | 3/2003 | Edwards | |
| 6,553,403 B1 | 4/2003 | Jarriel et al. | |
| 6,567,809 B2 * | 5/2003 | Santosuosso | 1/1 |
| 6,681,232 B1 * | 1/2004 | Sistanizadeh et al. | 1/1 |
| 6,687,702 B2 * | 2/2004 | Vaitheeswaran et al. | 1/1 |
| 6,738,933 B2 * | 5/2004 | Fraenkel et al. | 714/47.2 |
| 6,772,178 B2 * | 8/2004 | Mandal et al. | 1/1 |
| 6,779,002 B1 * | 8/2004 | Mwaura | 1/1 |
| 6,789,257 B1 | 9/2004 | MacPhail | |
| 6,792,456 B1 | 9/2004 | Hellerstein et al. | |
| 6,792,460 B2 * | 9/2004 | Oulu et al. | 709/224 |
| 6,795,791 B2 * | 9/2004 | Gorman | 702/124 |
| 6,802,054 B2 * | 10/2004 | Faraj | 717/128 |
| 6,802,067 B1 | 10/2004 | Camp et al. | |
| 6,834,301 B1 * | 12/2004 | Hanchett | 709/223 |
| 6,851,118 B1 * | 2/2005 | Ismael et al. | 719/330 |
| 6,853,995 B2 | 2/2005 | Matsuzaki et al. | |
| 6,874,020 B1 * | 3/2005 | Da Palma et al. | 709/223 |
| 6,880,125 B2 | 4/2005 | Fry | |
| 6,925,631 B2 | 8/2005 | Golden | |

(Continued)

OTHER PUBLICATIONS

J.Steven Perry, Java Management Extensions, O'Reilly Media, Inc, Pub Date Jun. 18, 2002, 1-30.*

(Continued)

*Primary Examiner* — Backhean Tiv
(74) *Attorney, Agent, or Firm* — Schwegman, Lundberg & Woessner, P.A.

(57) ABSTRACT

A method, apparatus, and system are provided for monitoring of system resources. According to one embodiment, managed beans may be provided to management applications. The managed beans may be registered with a managed bean server. The managed bean server along with a monitoring server may be used to monitor the resources. Monitoring data may be collected from monitoring of the resources, and may then be provided to the management applications.

18 Claims, 13 Drawing Sheets

U.S. PATENT DOCUMENTS

| | | | | |
|---|---|---|---|---|
| 6,931,427 B2* | 8/2005 | Musante et al. | | 709/201 |
| 6,952,726 B1* | 10/2005 | White et al. | | 709/224 |
| 6,985,848 B2 | 1/2006 | Swoboda et al. | | |
| 6,990,601 B1* | 1/2006 | Tsuneya et al. | | 714/4.5 |
| 6,993,453 B2 | 1/2006 | Krissell | | |
| 7,000,235 B2* | 2/2006 | Mandal et al. | | 719/315 |
| 7,017,051 B2* | 3/2006 | Patrick | | 726/12 |
| 7,017,162 B2 | 3/2006 | Smith et al. | | |
| 7,024,474 B2* | 4/2006 | Clubb et al. | | 709/223 |
| 7,051,324 B2 | 5/2006 | Gissel et al. | | |
| 7,058,558 B2 | 6/2006 | Reichenthal | | |
| 7,062,540 B2* | 6/2006 | Reddy et al. | | 709/217 |
| 7,069,267 B2* | 6/2006 | Spencer, Jr. | | 1/1 |
| 7,086,065 B1* | 8/2006 | Yeluripati et al. | | 719/311 |
| 7,086,067 B1* | 8/2006 | Wason | | 719/329 |
| 7,152,104 B2* | 12/2006 | Musante et al. | | 709/224 |
| 7,155,501 B2* | 12/2006 | Mandal et al. | | 709/223 |
| 7,174,370 B1* | 2/2007 | Saini et al. | | 709/220 |
| 7,194,682 B2* | 3/2007 | Warrington | | 715/229 |
| 7,200,588 B1 | 4/2007 | Srivastava et al. | | |
| 7,203,868 B1 | 4/2007 | Evoy | | |
| 7,206,827 B2* | 4/2007 | Viswanath et al. | | 709/220 |
| 7,233,989 B2* | 6/2007 | Srivastava et al. | | 709/224 |
| 7,240,334 B1 | 7/2007 | Fluke et al. | | |
| 7,251,809 B2 | 7/2007 | Barclay et al. | | |
| 7,287,075 B2* | 10/2007 | Srivastava et al. | | 709/224 |
| 7,290,045 B2* | 10/2007 | Mandal | | 709/223 |
| 7,290,249 B2* | 10/2007 | Sengodan | | 717/136 |
| 7,293,262 B2* | 11/2007 | Sengodan | | 717/136 |
| 7,373,556 B2* | 5/2008 | Srivastava et al. | | 714/47 |
| 7,376,671 B2* | 5/2008 | Simpson | | 1/1 |
| 7,395,526 B2* | 7/2008 | Arcand | | 717/127 |
| 7,412,497 B2* | 8/2008 | Viswanath et al. | | 709/220 |
| 7,433,917 B2* | 10/2008 | Renaud | | 709/203 |
| 7,493,624 B1* | 2/2009 | Kautzleben et al. | | 719/314 |
| 7,509,413 B2* | 3/2009 | Daniel et al. | | 709/224 |
| 7,526,519 B2* | 4/2009 | Potter et al. | | 709/200 |
| 7,577,731 B2* | 8/2009 | Frey et al. | | 709/223 |
| 7,725,572 B1* | 5/2010 | Kautzleben | | 709/224 |
| 7,756,968 B1* | 7/2010 | Frey et al. | | 709/224 |
| 2002/0029298 A1 | 3/2002 | Wilson | | |
| 2002/0186238 A1* | 12/2002 | Sylor et al. | | 345/736 |
| 2002/0188610 A1 | 12/2002 | Spencer | | |
| 2003/0051102 A1* | 3/2003 | Jacobs et al. | | 711/145 |
| 2003/0110252 A1* | 6/2003 | Yang-Huffman | | 709/224 |
| 2003/0120593 A1 | 6/2003 | Bansal et al. | | |
| 2003/0167304 A1 | 9/2003 | Zhu et al. | | |
| 2003/0225851 A1 | 12/2003 | Fanshier et al. | | |
| 2004/0022237 A1 | 2/2004 | Elliott et al. | | |
| 2004/0073782 A1 | 4/2004 | Price et al. | | |
| 2004/0078722 A1 | 4/2004 | Pfeiffer et al. | | |
| 2004/0148610 A1* | 7/2004 | Tsun et al. | | 719/316 |
| 2004/0158837 A1 | 8/2004 | Sengodan | | |
| 2004/0230973 A1 | 11/2004 | Cundiff, Jr. et al. | | |
| 2004/0249613 A1 | 12/2004 | Sprogis et al. | | |
| 2004/0268314 A1 | 12/2004 | Kollman et al. | | |
| 2005/0010608 A1* | 1/2005 | Horikawa | | 707/200 |
| 2005/0038889 A1 | 2/2005 | Frietsch | | |
| 2005/0097110 A1 | 5/2005 | Nishanov et al. | | |
| 2005/0102536 A1 | 5/2005 | Patrick et al. | | |
| 2005/0132337 A1 | 6/2005 | Wedel et al. | | |

OTHER PUBLICATIONS

Wikipedia, Run Time(computing), pp. 1-2.*
IBM, JMX notifications and monitors, pp. 1-4.*
Wikipedia, Computer Cluster, pp. 1-5.*
McLaughlin, Brett, "Tip: Set up a SAX Parser", Published by *International Business Machines Corporation* on Jul. 2, 2003.
"Java Logging Overview", (Nov. 2001), pp. 1-9.
"Jikes Bytecode Toolkit: Overview", *Alphaworks*, www.alphaworks.ibm.com/tech/jikesbt, posted Mar. 31, 2000, 2 pages, printed Sep. 28, 2006.
"Mobile-Code Security Mechanisms for Jini", *Mobile-Code Security Mechanisms for Jin—"Mobile-Code Security Mechanisms for Jini"* Download code, DISCEX 2001 Paper, http://theory.stanford.edu/people/jcm/software/jinifilter.html, printed Jul. 2, 2004—(3 pgs.), (2001), 2 pgs.
"Monitoring", http://help.sap.com/saphelp_webas630/helpdata/en/68/f4bc3deaf28d33e10000000a11405..., Monitoring (SAP Library—J2EE Technology in SAP Web Application Server), (Downloaded Dec. 14, 2004).
"Operating System Monitor", http://help.sap.com/saphelp_nw04/helpdata/en/55/b5b93b5bb3493fe10000000a114084/frameset.htm, SAP Library, (Downloaded Dec. 14, 2004).
"Package Gnu.Bytecode", *Package Gnu.Bytecode*, http://sources.redhat.com/kawa/api.gnu/bytecode/package-summary.html, 4 pages, printed Sep. 28, 2006.
"The Alert Monitor", http://help.sap.com/saphelp_nw2004s/helpdata/en/28/83493b6b82e908e10000000a11402f/content.htm, SAP Library, (Downloaded Dec. 14, 2004).
"The Java Object Instrumentation Environment", *Duke University*, www.cs.duke.edu/ari/joie/, last updated May 2003, printed Sep. 28, 2006, 2 pages.
"The Monitoring Architecture: Concept", http://help.sap.com/saphelp_nw04/helpdata/en/c4/3a7da1505211d189550000e829fbbd/frameset.htm, SAP Library, (Downloaded Feb. 27, 2008).
"The SAP J2EE Engine Monitoring Architecture", http://help.sap.com/saphelp_webas630/helpdata/en/83/6b20165833fa43b28f0349a4d3108..., The SAP J2EE Engine Monitoring Architecture (SAP Library—J2EE Technology in SAP . . . , (Downloaded Dec. 14, 2004).
"The Source for Developers: Core Java Java Management Extensions (JMX)", *Sun Microsystems, Inc.*, "The Source for Developers: Core Java Java Management Extensions (JMX)" 2 pages, http://java.sun.com/products/JavaManagement/printed Apr. 2, 2004, 2 pages.
"The Wily 5 Solution—Enterprise Aplications are Your Business", *Wily Technology, Inc., Wily Technology, Inc., Wily Solutions* "The Wily 5 Solution—Enterprise Aplications are Your Business", http://www.wilytech.com/solutions/ibm_family.html, 1999-2004, printed Jul. 2, 2004 (2 pgs.), (1999-2004), 2 pgs.
Office Action May 30, 2008, Office Action mailed May 30, 2008 for Pending U.S. Appl. No. 10/749,733.
USPTO, Non-Final Office for U.S. Appl. No. 10/813,788 mailed Jul. 31, 2008.
USPTO, "FOA Mailed Sep. 3, 2008, for U.S. Appl. No. 10/815,018", (Sep. 3, 2008).

* cited by examiner

ARCHITECTURE AND METHOD FOR MONITORING SYSTEM RESOURCES WITHIN AN ENTERPRISE NETWORK

CROSS-REFERENCES TO RELATED APPLICATIONS

This application is related to U.S. application Ser. No. 10/748,774 titled METHOD AND SYSTEM FOR EMPLOYING A HIERARCHICAL MONITOR TREE FOR MONITORING SYSTEM RESOURCES IN A DATA PROCESSING ENVIRONMENT, filed on Dec. 31, 2003, now U.S. Pat. No. 7,756,968, U.S. application Ser. No. 10/748,951 titled SYSTEM AND METHOD FOR MONITORING PROGRAM CODE, filed on Dec. 31, 2003, now U.S. Pat. No. 7,577,731, U.S. application Ser. No. 10/749,733 titled MANAGEMENT ARCHITECTURE AND METHOD EMPLOYED WITHIN A CLUSTERED NODE CONFIGURATION, filed on Dec. 30, 2003, now U.S. Pat. No. 7,493,624.

BACKGROUND OF THE INVENTION

1. Field of the Invention

Embodiments of this invention generally relate to system resource monitoring and more particularly, to monitoring of resources using Java monitoring architecture.

2. Description of Related Art

In many modern computing systems and networks (systems), monitoring of system resources and components of significant importance to ensure not only the reliability and security of information flow, but also to promptly detect system deficiencies so that they are corrected in a timely manner. Typically, conventional client-server monitoring systems or architectures are used to perform monitoring of the resources.

FIG. 1 is a block diagram illustrating a conventional prior art monitoring system. As illustrated, typically, a conventional monitoring system (conventional system) 100 includes a monitor server 102 coupled with a client 104 and a data storage medium (storage) 110. The monitor server 102 is to monitor system resources (resources) 106-108 for the client 104. The monitor server 102 monitors the resources 106-108 in response to a request for monitoring received from the client 104. Typically, the storage 110 is used to store the monitoring data or information gathered by the monitoring server 102 from monitoring of the resources 106-108, and the monitoring data is then reported to the client 104. Stated differently, the data is not provided to the client 104 in real-time, delaying the detection and correction of deficiencies.

Conventional monitoring systems, however, do not provide real-time, continuous, or adequate monitoring of the resources, as they are limited in performance because of, for example, architectural limitations, inflexibility in levels of monitoring, lack of convenience in viewing the monitoring data, low level programming interface, and having the resources shared by all the software running on the system including virtual machines.

SUMMARY OF THE INVENTION

A method, apparatus, and system are provided for monitoring of system resources. According to one embodiment, managed beans may be provided to management applications. The managed beans may be registered with a managed bean server. The managed bean server along with a monitoring server may be used to monitor the resources. Monitoring data may be collected from monitoring of the resources, and may then be provided to the management applications.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
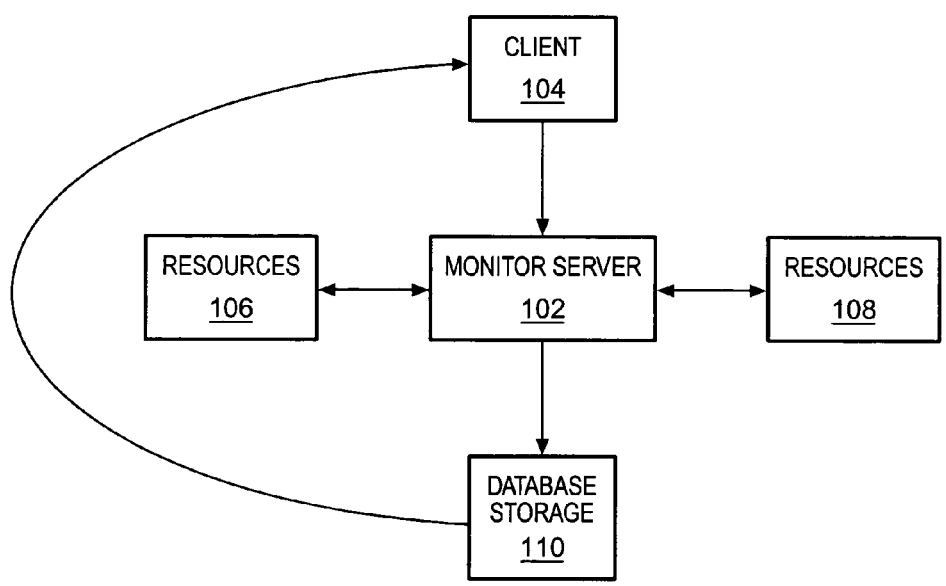
FIG. 1 is a block diagram illustrating a conventional prior art monitoring system.

A method, apparatus, and system are provided for monitoring of system resources. According to one embodiment, a monitor server may be used to monitor system resources, to collect monitoring data associated with the resources, and to provide the monitoring data to a destination. The monitor server may include a Java Management Extensions (JMX)-based monitor server. Further, a managed bean server having a registry of managed beans may be coupled with the monitor server to facilitate the monitor server to monitor the resources. The resources may include, for example, Java resources associated with a Java 2 Platform, Enterprise Edition ("J2EE") engine. However, the underlying principles of the invention are not limited to any particular programming standard or application server architecture.

According to one embodiment, the destination may include a computing center management system ("CCMS"), a well known management and monitoring architecture designed by SAP AG for use in R/3 systems. Additional and/or alternate destinations may include administrative tools/viewers, standard Web browsers, and third party tools/viewers. The destination may be used to originate a request for the monitor server to perform the monitoring of the resources, and to receive the monitoring data resulting from the monitoring of the resources. The monitoring data may be displayed at its destination (e.g., using a monitor viewer from the administrative tools).

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
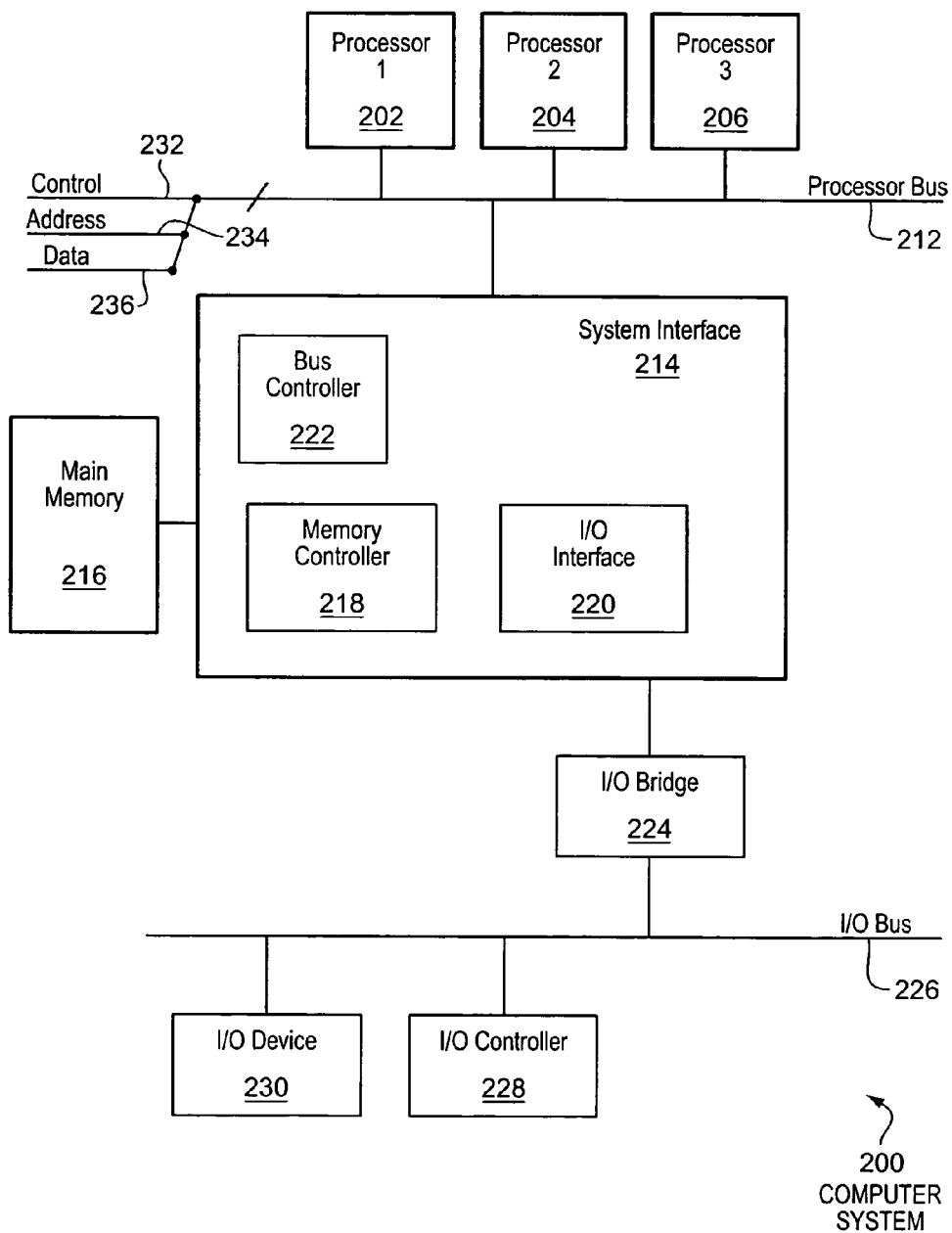
FIG. 2 is a block diagram illustrating an embodiment of a computer system.

FIG. 2 is a block diagram illustrating an embodiment of a computer system. The computer system (system) includes one or more processors 202-206 including one or more microprocessors, microcontrollers, field programmable gate arrays (FPGA), application specific integrated circuits (ASIC), central processing units (CPU), programmable logic devices (PLD), and similar devices that access instructions from system storage (e.g., main memory 216), decode them, and execute those instructions by performing arithmetic and logical operations.

The processor bus 212, also known as the host bus or the front side bus, may be used to couple the processors 202-206 with the system interface 214. The processor bus 212 may include a control bus 232, an address bus 234, and a data bus 236. The control bus 232, the address bus 234, and the data bus 236 may be multidrop bi-directional buses, e.g., connected to three or more bus agents, as opposed to a point-to-point bus, which may be connected only between two bus agents.

The system interface 214 may be connected to the processor bus 212 to interface other components of the system 200 with the processor bus 212. For example, system interface 214 may includes a memory controller 218 for interfacing a main memory 216 with the processor bus 212. The main memory 216 typically includes one or more memory cards and a control circuit (not shown). System interface 214 may also include an input/output (I/O) interface 220 to interface the I/O bridge 224 with the processor bus 212. The I/O bridge 224 may operate as a bus bridge to interface between the system interface 214 and an I/O bus 226. One or more I/O controllers 228 and I/O devices 230 may be connected with the I/O bus 226, as illustrated. I/O bus 226 may include a peripheral component interconnect (PCI) bus or other type of I/O bus.

The system 200 may include a dynamic storage device, referred to as main memory 216, or a random access memory (RAM) or other devices coupled to the processor bus 212 for storing information and instructions to be executed by the processors 202-206. The main memory 216 also may be used for storing temporary variables or other intermediate information during execution of instructions by the processors 202-206. System 200 may include a read only memory (ROM) and/or other static storage device coupled to the processor bus 212 for storing static information and instructions for the processors 202-206.

The main memory 216 may include a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. The main memory 216 may also include one or more hard disks, floppy disks, ZIP disks, compact disks (e.g., CD-ROM), digital versatile/video disks (DVD), magnetic random access memory (MRAM) devices, and other system-readable media that store instructions and/or data. The main memory 216 may store program modules such as routines, programs, objects, images, data structures, program data, and other program modules that perform particular tasks or implement particular abstract data types that facilitate system use.

The I/O device 230 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. The I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

The system 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of system 200 will vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 3:
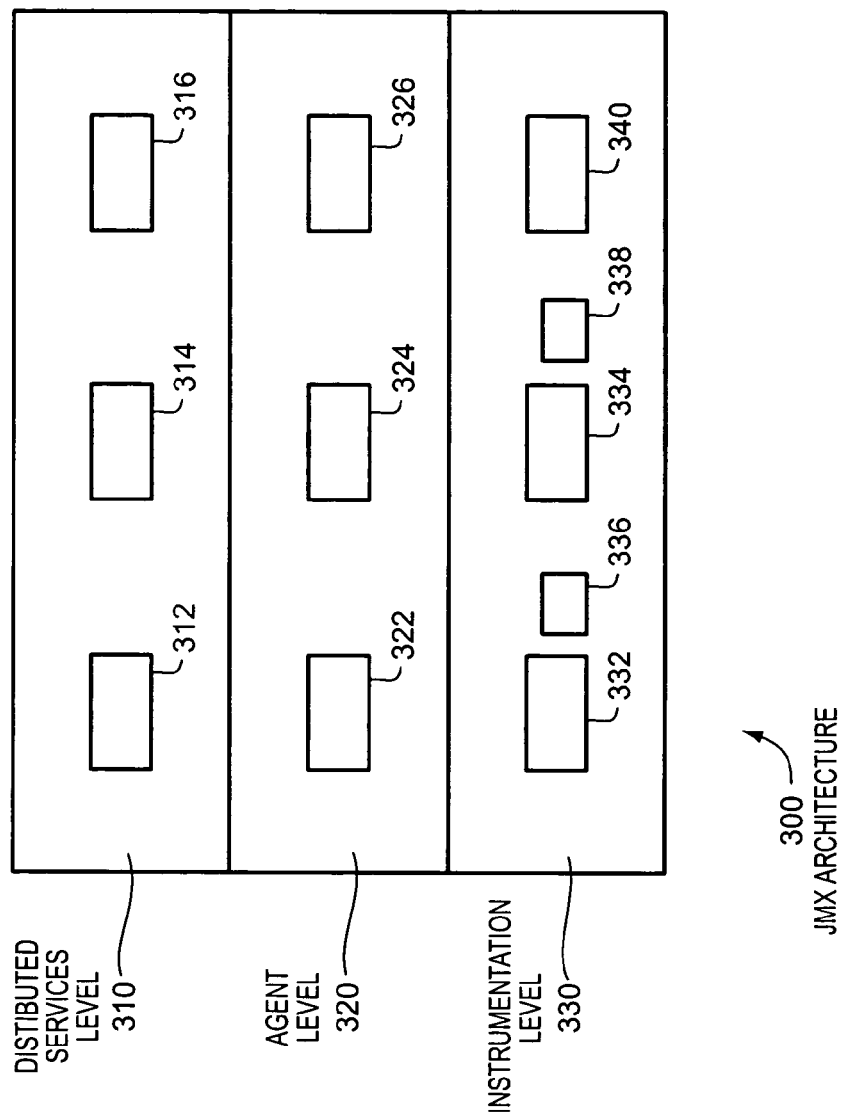
FIG. 3 is a block diagram illustrating an embodiment of Java Management Extensions architecture.

FIG. 3 is a block diagram illustrating an embodiment of Java Management Extensions architecture. The illustrated embodiment of Java Management Extensions ("JMX") architecture 300 includes three layers or levels 310, 320, 330. According to one embodiment, the three levels 310, 320, 330 may include a distributed services level (or manager or user or client level) 310, an agent level (or application level) 320, and an instrumentation level (or database level) 330. Some or all of the elements at each of levels of the JMX architecture 300 may be, directly or indirectly, interconnected via a network (e.g., a Local Area Network ("LAN")). Alternative embodiments of the JMX architecture 300 may include more or fewer levels.

The distributed services level 310 may serve as an interface between the JMX architecture 300 and one or more users or clients. As illustrated, the distributed services level 310 may include one or more user terminals 312-314. One or more of the user terminals 312-314 to collect and gather user input and send it to the agent level 320 over a network connection. Network connection may be a wired or wireless connection to a Local Area Network (LAN), a Wide Area Network (WAN), a Metropolitan Area Network (MAN), an intranet, and/or the Internet. Distributed services level terminals 312-314 may include personal computers, notebook computers, personal digital assistants, telephones, and the like. According to one embodiment in which network connection may connect to the Internet, one or more of the user terminals 312-314 may include a Web browser (e.g., Internet Explorer or Netscape Navigator) to interface with the Internet.

According to one embodiment, the distributed services level 310 may also include management applications 316, such as a JMX-compliant management application, a JMX manager, and/or a proprietary management application. The management applications 316 may also include one or more graphical management applications, such as a visual administrator, operating to, for example, retrieve and display information received from the agent level 320 and/or the instrumentation level 330.

The visual administrator may include a monitor viewer to display such information. Management applications 316 may also include third party tools including a file system to store the information and may also include a Graphical User Interface ("GUI")-based monitor viewer to display the information. The distributed services level 310 may also include the CCMS system described above.

The agent level 320 may include one or more application servers 322-326. An application server may refer to a computing device that performs data processing. The agent level 320 may also include a computing device (e.g., a dispatcher) to perform load balancing among application servers 322-326. According to one embodiment in which the agent level 320 exchanges information with the distributed services level 310 via the Internet, one or more of the application servers 322-326 may include a Web application server. According to one embodiment, the application servers 322-326 may be implemented according to the Java 2 Enterprise Edition Specification v1.4, published on Jul. 12, 2002 ("the J2EE Standard").

The applications servers 322-326 may include one or more dedicated Java Managed Bean ("MBean") servers having agent services. According to one embodiment, for and at each Java virtual machine ("JVM") with managed resources, there may be one or more agents operating at the agent level 320. The one or more agents may include the one or more MBean servers, agent services, a set of MBeans, one or more connectors, and/or one or more protocol adaptors. An MBean Server may include a registry for MBeans and act as a single entry point for calling MBeans in a uniform fashion from management applications at other JVMs.

The instrumentation level 330 may provide a data storage medium for the JMX architecture 300. As illustrated, according to one embodiment, the instrumentation level 330 may include one or more database management systems ("DBMS") 332-334 and data sources 336-338. According to one embodiment, the data sources 336-338 may include databases and/or other systems capable of providing a data store.

Furthermore, according to one embodiment, the instrumentation level 330 may include one or more hosts including one or more resources having MBeans, such as instrumentation MBeans. The instrumentation level 330 may make Java objects available to management applications 316. The Java objects instrumented according to the JMX-standard may include MBeans. According to one embodiment, the resources represented by MBeans may include managed resources 340. The managed resources 340 may include a kernel, a server component, or the like. MBeans may expose a management interface including constructors, attributes, operations, and notifications.

Figure 4:
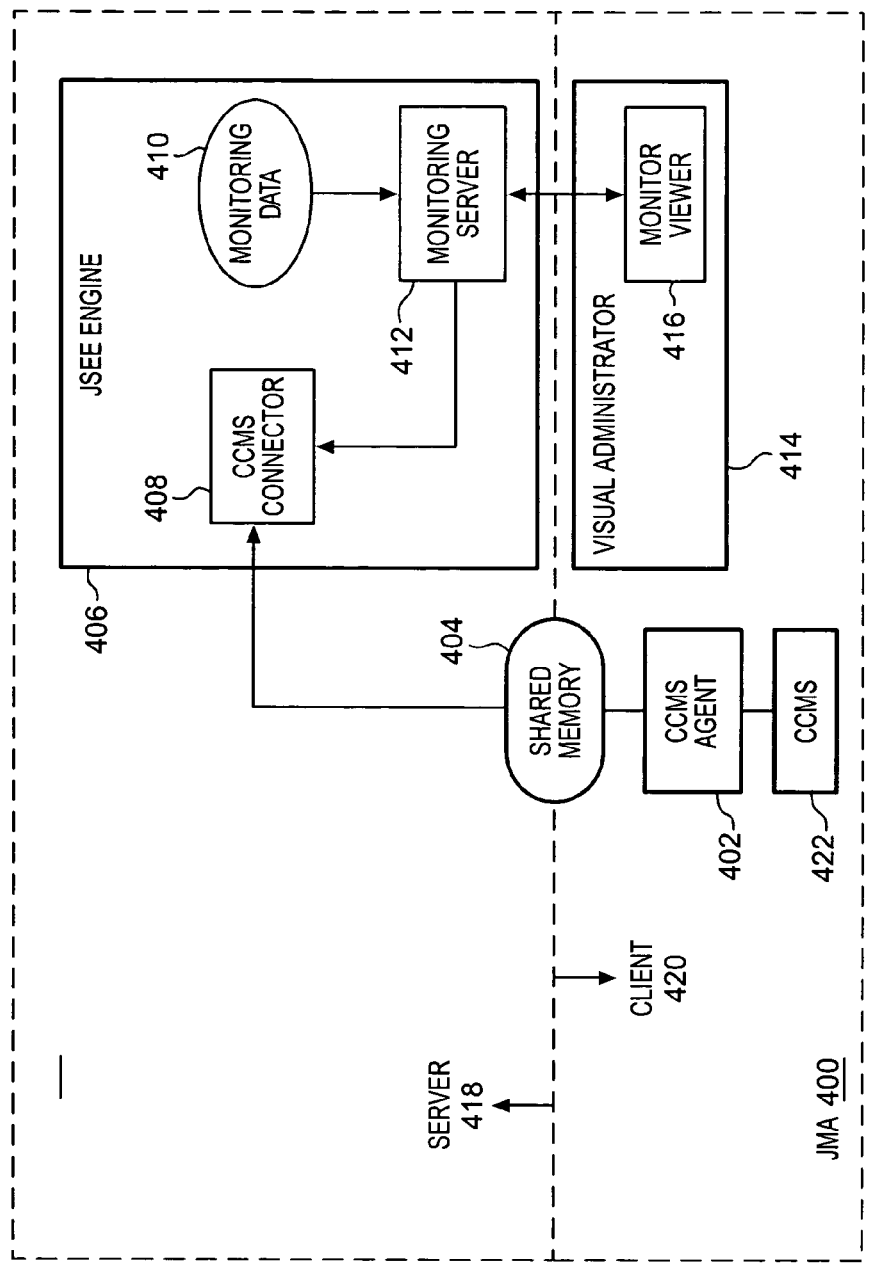
FIG. 4 is a block diagram illustrating an embodiment of Java monitoring architecture.

FIG. 4 illustrates one embodiment of the invention. The illustrated embodiment of the Java monitoring architecture (JMA) 400 is based on Java Management Extensions compliant monitoring architecture (JMX architecture) for administration and management of the Java 2 Platform, Enterprise Edition ("J2EE") engine 406. According to one embodiment, the administration and management of the resources associated with the J2EE engine 406 may include monitoring of various system resources, including Java resources and other arbitrary resources and resources associated with the J2EE engine 406, including kernel, services, interfaces, libraries for each of the dispatchers and servers, network connections, memory consumption, threads, classloaders, database connections, database transactions, HyperText Transport Protocol ("HTTP") cache, Java Messaging Service ("JMS") queries and topics, sessions, and the like, using a monitoring service, such as the monitoring service 412.

According to one embodiment, various services of the monitoring service 412 may include monitoring of the resources, gathering of the monitoring data relating to the monitored resources, and maintaining of the monitoring data 410. The maintaining of the monitoring data 410 may include maintaining history and providing alerts when various resources, such as parameters, applications, or components reach a critical state, and such features may be enabled or disabled depending on when and whether the J2EE engine 406 is connected to the CCMS 422 via CCMS agent 402 with shared memory 404, directly or indirectly, coupled with the CCMS agent 402 and CCMS connector 408.

According to one embodiment, the JMA 400 may include the monitoring service 412 and one or more JMX-based monitor servers (JMX monitors). The monitoring service 412 may help establish a connection between a JMX monitor and the various components of the JMA 400. According to one embodiment, JMX monitors may reside and work on separate or remote Java virtual machines (JVMs) to collect data from cluster elements, and report information and statistics regarding the cluster nodes and their components to, for example, the visual administrator 414 having a monitor viewer 416, and/or to the CCMS 422 via the CCMS agent 402, and to various other third party tools. The CCMS 422, the visual administrator 414, and other third party tools may reside generally on the client side 420, while other components, as illustrated, may reside on the server side 418. In one embodiment of the invention, the management techniques described herein are used to manage resources within a "cluster" of server nodes. An exemplary cluster architecture is described below with respect to FIGS. 12-13. However, the underlying principles of the invention are not limited to any particular application server architecture.

Figure 5:
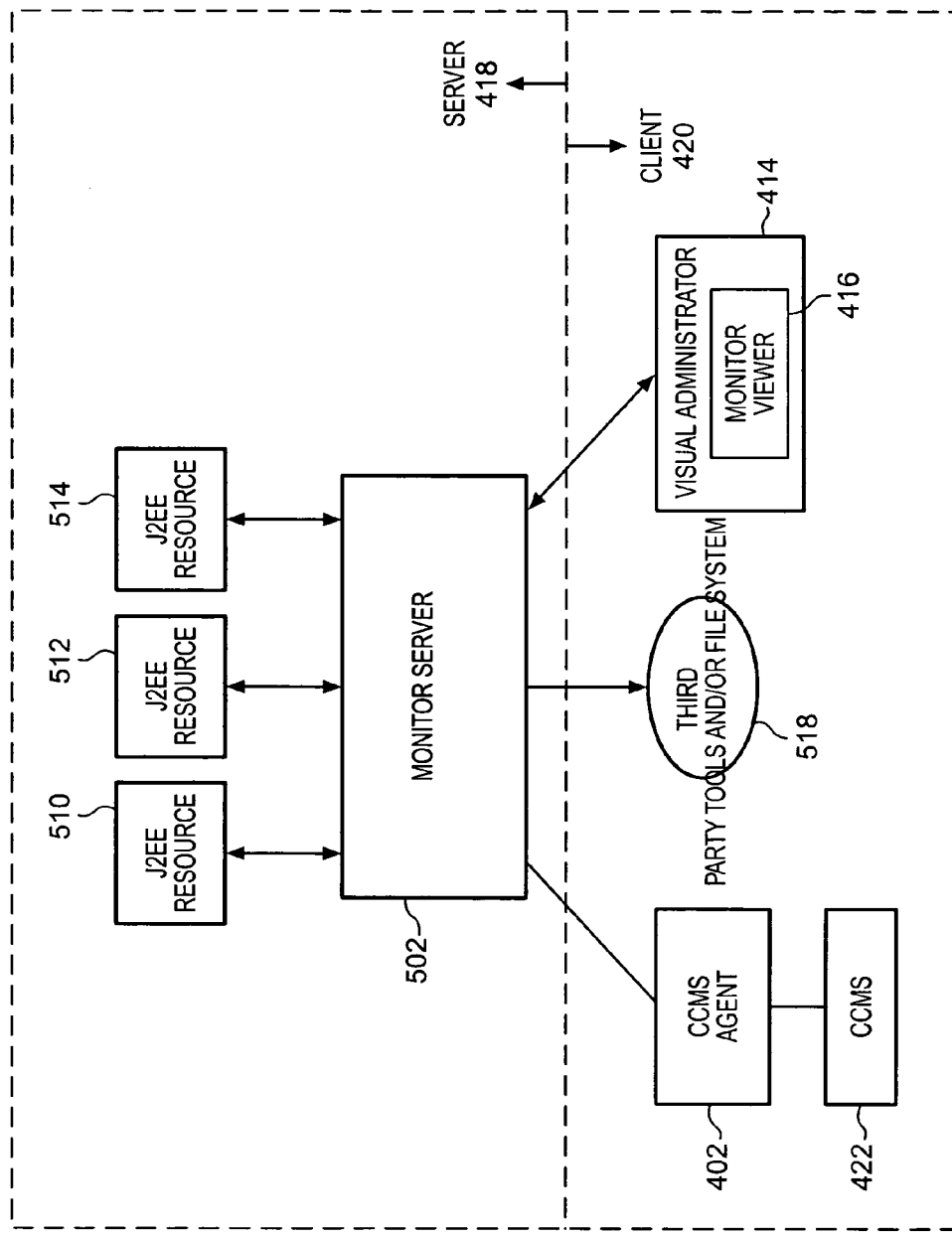
FIG. 5 is a block diagram illustrating an embodiment of Java monitoring architecture.

FIG. 5 illustrates an embodiment of the invention employed within a Java monitoring architecture ("JMA") 500. The illustrated embodiment includes a monitor server 502 comprised of a JMX-based monitors (JMX monitor) to, for example, monitor and collect data from various cluster elements and resources 510-514 of an application server engine. In one embodiment the application server engine is a Java 2 Platform, Enterprise Edition (J2EE) engine (e.g., J2EE engine 406 of FIG. 4). However, as stated above, the underlying principles of the invention are not tied to any particular specification or set of specifications. According to one embodiment, the monitor server 502 reports or transmit the collected data to various client-side 420 components and/or applications, such the visual administrator 414 having a monitor viewer 416. The monitor viewer 416 may be used to enable viewing of the monitoring data received from the monitor server 502.

The data collected may include information and statistics related to, for example, applications, server parameters, cluster nodes and their components of the J2EE engine. According to one embodiment, the collected data may also be reported to the CCMS 422 via a CCMS agent 402, and/or to the third party tools 518. In one embodiment, the third party tools 518 include a file system to, for example, temporarily store the collected data in a specified file format such as, for example, an Extensible Markup Language ("XML") format or a HyperText Markup Language ("HTML") format. The collected data may subsequently be reported to the components on the client-side 420 (e.g., in an XML or HTML format.

According to one embodiment, the expected overhead of the JMA 500 may vary according to its functionality. For example, the overhead may be light when reporting to the CCMS 422 or the third party tools 518, as opposed to when reporting to the visual administrator 414. Furthermore, the larger the requesting and/or reporting interval of the monitor server 502, the smaller the expected overhead may be. The expected overhead may be relatively higher when using the monitor viewer 416 of the visual administrator 414 to actively retrieve and view the monitoring data.

Figure 6:
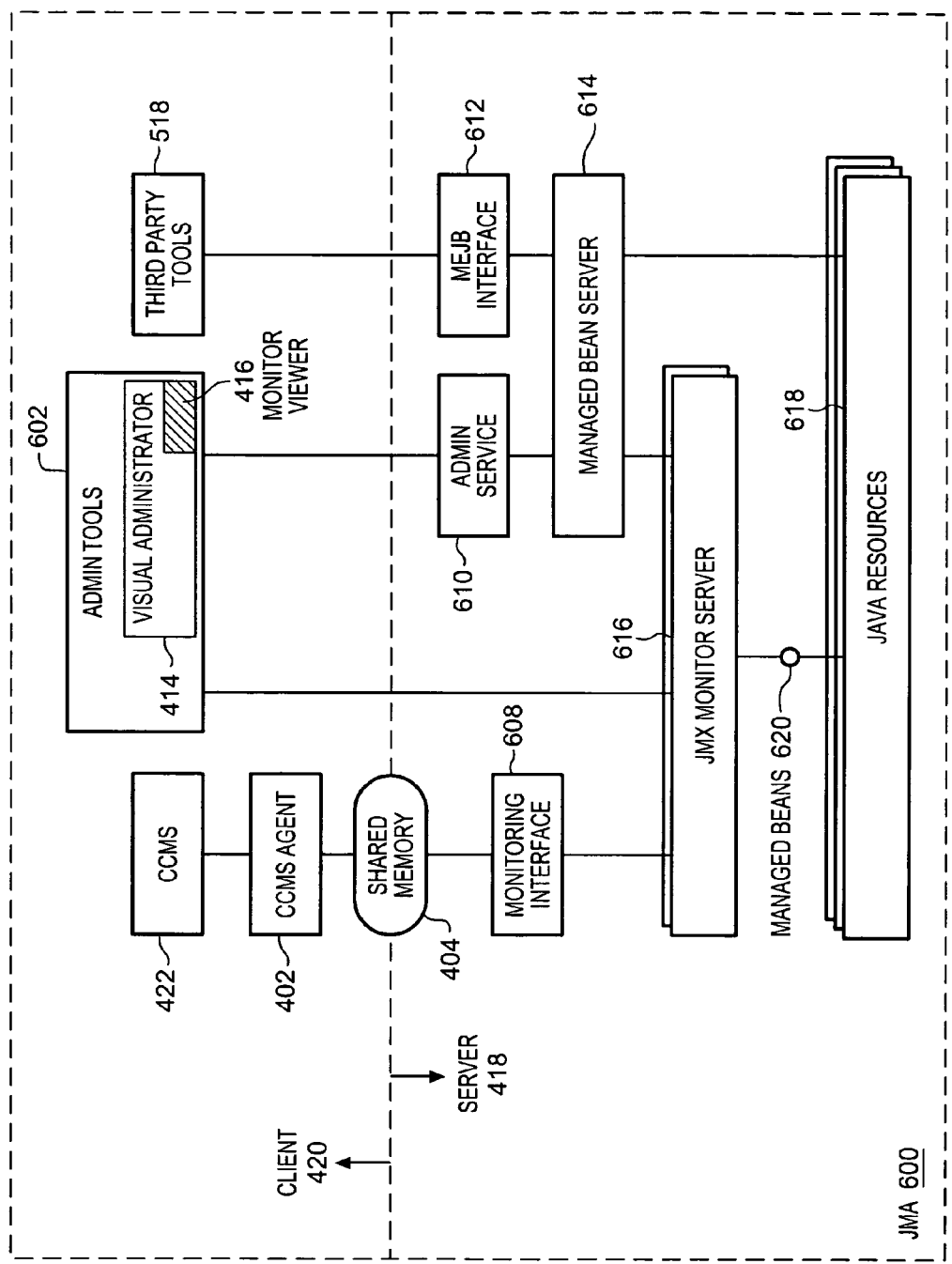
FIG. 6 is a block diagram illustrating an embodiment of Java monitoring architecture.

FIG. 6 provides certain additional details associated with one embodiment of the invention. Monitoring typically refers to a periodic oversight of a process, or the implementation of an activity, which seeks to establish the extent to which input deliveries, work schedules, other required actions and targeted outputs are proceeding according to plan, so that timely action can be taken to correct the deficiencies detected. According to one embodiment, Java monitoring system or architecture ("JMA") 600 and its various components may be used to provide monitoring of resources and the semantics of data to ensure oversight and may provide information for correct analysis of the monitored resources 618. Furthermore, according to one embodiment, JMA 600 may ensure first level of data processing, analysis, evaluating, and transporting of the data to various customer-level analysis modules and systems (e.g., a monitoring tree, CCMS systems, and third-party plug-ins).

According to one embodiment, the Java Management Extensions (JMX)-based JMA 600 may be used to provide monitoring of the Java 2 Platform, Enterprise Edition (J2EE) engine, such as the J2EE Engine 406 of FIG. 4, and its Java resources (resources) 618 including various managers, services, components, such as a kernel, interfaces, libraries for each of the dispatchers and servers, network connections, memory consumption, threads, classloaders, database connections, database transactions, HyperText Transport Protocol ("HTTP") cache, Java Messaging Service ("JMS") queues and topics, and sessions.

According to one embodiment, the JMX may serve as a protocol used inside the J2EE engine 406 for the purposes of administering, managing, and monitoring of the Java resources 618. According to one embodiment, for Java monitoring, the JMA 600 may employ a management interface, such as the Managed Bean server ("bean server") 614 which registers and manages Managed Beans ("beans") 620. The bean server 614 may include a container for the beans 620 to provide them access to various types of management applications which use the beans 620 to manage the Java resources 618.

According to one embodiment, to provide managed beans 620 to various management applications and to use the bean server 614 for such purposes, the management applications may be made available via the distributed services level of the JMX architecture (e.g., distributed services level 310 of FIG. 3). For example, well-known protocols (e.g., HTTP) may be used with an appropriate "protocol adapter" that may translate operations into representations in a given protocol, or one or more "connectors" may be used to provide the same interface to the management applications as the bean server 614 using a proprietary protocol.

Protocol adapters generally listen for incoming messages that are constructed in a particular protocol (e.g., such as like HTTP or SNMP). As such, protocol adapters are comprised of only one component that resides in the MBean server. For example, clients equipped with Web browsers may communicate with the bean server 614 via an HTTP protocol adapter.

By contrast, connectors are generally comprised of two components, one which resides on the bean server 614 and the other which resides on the client-side applications. Thus, connectors hide the underlying protocol being used to contact the MBean server (i.e., the entire process happens between the connector's two components). Throughout this detailed description, it is assumed that communication with an MBean server occurs via a protocol adapter and/or connector of that MBean server, notwithstanding the fact that the protocol adapter/connector may not be explicitly described or illustrated.

As mentioned above, the JMA 600 may be logically divided into a distributed services level 310, an agent level 320, and an instrumentation level 330. The instrumentation level 330 may consist the managed Java resources and their beans 620, the agent level 320 may include the bean server 614, and the distributed services level 310 may include various management applications, adaptors, and connectors.

According to one embodiment, various resources 618 of the J2EE engine 406 may be at the agent level 320 and may be included as an external library. A JMX service module (e.g., jmx_service) may provide some of the functionality from the distributed services level 310, and may create an instance of the bean server 614 on each of the nodes in one or more clusters and provide local and cluster connections to all of them. A user or client of the JMX architecture may work with the bean server 614 transparently, e.g., from the user's perspective there may be only one bean sever 614 having beans 620 registered clusterwide. In addition, to receive JMX notifications clusterwide, another service module (e.g., jmx_notification service), coupled with the JMX service, may be employed.

The bean server 614 may include a registry of beans 620 and may serve as a single entry point for calling beans 620 in a uniform fashion from management applications to monitor the resources 618, and collect or gather the monitoring data regarding and associated with the monitored resources 618. According to one embodiment, the bean server 614 may reside at a particular Java virtual machine (JVM) and may call the registered beans 620 from the same JVM or other JVMs. According to one embodiment, the bean server 614 may not be limited to one bean server 614 and may include multiple managed bean servers. According to one embodiment, the JMX monitor 616 may also reside at the same JVM along with the bean server 614 and its corresponding registered beans 620 or, according to another embodiment, the JMX monitor 616 may reside at other one or more JVMs that may be remotely located. The JMX monitor 616 may not be limited to one JMX monitor server and may include multiple JMX monitor servers.

The JVM may include one or more agents having a Java monitoring interface (monitoring interface) 608, JMX monitor 616, bean server 614, beans 620, other agent services, and one or more connectors or protocol adaptors. Stated differently, the JMX monitor 616, the monitoring interface 608, the bean server 614, and the beans 620 may be hosted by the same JVM or a different JVM located, locally or remotely, as part of the JMX architecture and JMA 600.

A typical management application may run on its own JVM along with a remote mechanism or access required for such purposes. The remote mechanism may be accomplished either by one or more connectors or protocol adaptors.

In one embodiment, a monitoring interface 608 performs protocol translation functions to couple the JMX monitor 616 and other components and modules of the JMA 600 to an external monitoring system such as the CCSM 422. As mentioned above, CCMS is a well know central management architecture developed by SAP AG. BY translating between the CCMS-based protocol and JMS-based protocols, the monitoring interface 608 effectively links the two systems. As a result, monitoring data collected from resources by MBeans 620 is accessible from within the CCMS system (e.g., via a CCMS-enabled client), and vice-versa. In one embodiment, a shared memory 404 is provided to implement the interface. For example, monitoring information translated by the monitoring interface 608 may be stored within the shared memory 404. A CCMS agent 402 may then read the information from the shared memory and forward the information to the CCMS system 422. In one embodiment, the agent 402 reads from the shared memory 402 periodically (e.g., based on preset time intervals). However, the agent 402 may also read from the shared memory 404 dynamically (e.g., in response to a user request).

According to one embodiment, the kernel (e.g., operating system) and server components (e.g., libraries, interfaces, and services) of the J2EE Engine 406 may be instrumented and monitored using the beans 620 registered with the bean server 614 and using the JMX monitor 616. For example, the beans 620, registered with the bean server 614, may be used to collect the monitoring data associated with the resources 618 which may then be collected from these beans 620 by one or more JMX monitors 616. The monitoring data may then be made available to the CCMS 422 via the monitoring interface 608 (as described above).

The JMA 600 may also include administrative services interface (services interface) 610 to link, for example, the JMX monitor 616 and the bean server 614 of the to the one or more administrative tools 602. The administrative tools 602 may include a visual administrator 414 having a monitor viewer 416. According to one embodiment, the collected monitoring data may be sent to various local and/or remote destinations on the client-side 412 of the JMA 600. For example, on the client-side 412, the data may be sent to the visual administrator 414, the CCMS 422, or various other third party tools 604 including, for example, a file system. The monitoring data may be received by the third party tools 604 from the bean server 614 via a Managed Enterprise JavaBeans ("MEJB") interface 612.

According to one embodiment, the overhead from using the visual administrator 414 may be reduced by using a Graphical User Interface ("GUI") tool and displaying selective data. The GUI tool may be included in one of the administrative tools 602 and/or third party tools 604. Furthermore, the monitoring data may be reported and organized according to and by its destination, such as the CCMS 422, the administrative tools 602, and the third party tools 604.

According to one embodiment, the following two logical types of beans 620 may be registered: (1) standard beans and (2) specific beans. Standard beans may provide standard functionality such as start/stop the associated resource, get/set properties of the associated resource, etc. Standard beans may be registered by default for all deployed components (e.g., kernel, libraries, interfaces, and services). Specific beans may provide component-specific functionalities that may vary from one component to another. To have the specific beans, a component may register an object that may implement a specific interface to list the processes available for its management and to extend the management interface (e.g., com.company.engine.frame.state. ManagementInterface).

According to one embodiment, for a kernel, a standard bean may be registered with each manager having a specific bean. A prerequisite for this may be to return a non-null value in a method (e.g., getManagementInterface( ) from the manager interface. For libraries and interfaces, only standard beans may be registered. For services, except for the already registered standard beans, each of the services may register specific beans, and implementation of the management interface may also cause a specific bean to be registered for that particular service.

The MEJB interface 612 may be used to couple the JMX monitor 616 with the bean server 614 and the third party tools 604. The MEJB interface 612 may be a remote interface of the bean server 614 (e.g., bean server interface). According to one embodiment, the MEJB interface 612 may be implemented on top of the bean server 614. The MEJB interface 612 may forward its MEJB call to the bean server 614, and the bean server 614 may forward its MEJB call to the beans 620.

According to one embodiment, MEJB may include software component of the J2EE Engine 406 to provide a relatively pure Java environment for developing and running distributed applications. MEJB may be written as software modules containing the business logic of the application. Furthermore, MEJB may reside in and may be executed in a runtime environment (e.g., MEJB container), which may provide a number of common interfaces and service to the MEJB. The common interfaces and services may include security and transaction support. MEJB may include the following three types of beans: (1) session beans to perform processing; (2) entity beans to represent data, which can be a row, a column, or a table in a database, and (3) message driven beans that are generated to process Java messaging service (JMS) messages.

According to one embodiment, the MEJB interface 612 may provide future scalability and allow multiple user interfaces to be used, such as a Web browser and a Java application may be used to access MEJBs, or one may be switched from the other at a later time. Servlets, JSPs, and regular Java applications may be used in lieu of (or in addition to) the MEJBs.

Figure 7:
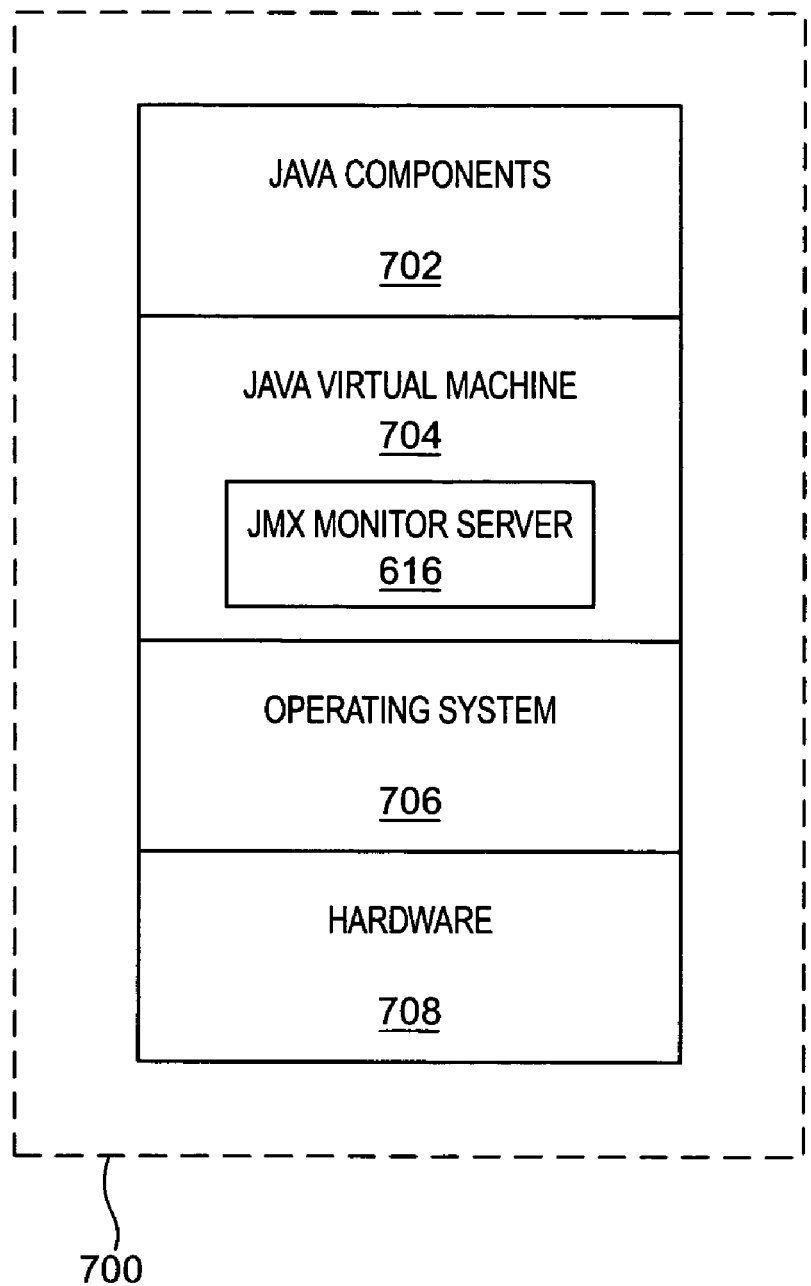
FIG. 7 is a block diagram illustrating an embodiment of a Java virtual machine environment.

FIG. 7 illustrates an embodiment of a Java virtual machine within which elements of the invention are employed. As illustrated, the Java virtual machine ("JVM") environment 700 may include various Java components 702 including Java software components, modules and programs, such as Java applications and applets. The Java components 702 may be processed via a Java virtual machine ("JVM") 704. The processing of the Java components 702 may include processing the Java components 702 from platform-independent bytecode to platform-specific native code at the JVM 704. Typically, a Java application may refer to a standalone program running outside a Web browser, while a Java applet may refer to a program running inside and by a Java-based Web browser.

According to one embodiment, various components or modules of the JMA 600 illustrated in FIG. 6 may be implemented or run using the JVM 704. For example, a Java Management Extensions-based monitor server (JMX monitor) 616 may be run using the JVM 704. The JMX monitor 616 may be run in the following two modes: (1) via the JVM 704 as a server node or standalone node of the Java 2 Platform, Enterprise Edition (J2EE) engine (e.g., J2EE engine 406 of FIG. 4) or (2) via a separate JVM, other than the JVM 704, as a separate operating system process. According to one embodiment, running the JMX monitor 616 using a separate JVM may provide an automatic startup or configuration, and may be preferred for certain uses, while the option of using the JVM 704 may provide a separate console and may be used for, for example, configuration testing. The JVM environment 700 may further include an operating system 706 and system hardware 708 where the Java components 702 may be executed.

Figure 8:
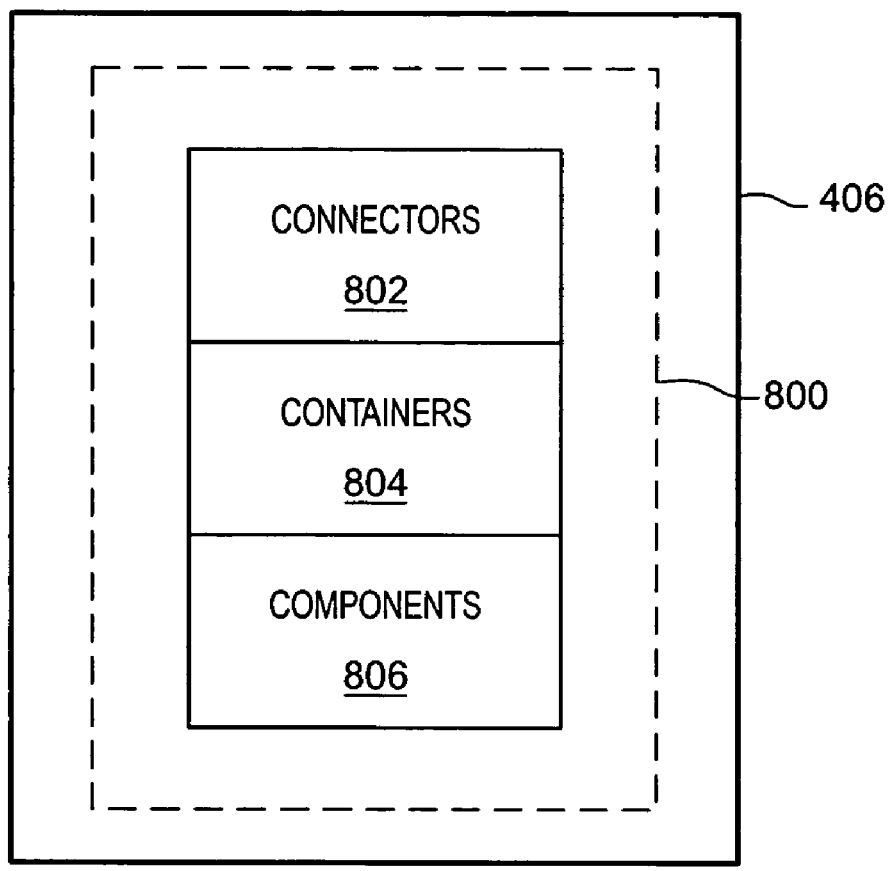
FIG. 8 is a block diagram illustrating an embodiment of a Java 2 Platform, Enterprise Edition engine model.

FIG. 8 is a block diagram generally illustrating an embodiment of an application server model comprising connectors 802, containers 804, and components 806. In one embodiment the application server model is based on the J2EE standard. The connectors 802, for example, may include adapters (e.g., portable adapters), to provide portable services from other applications along with the existing services of the J2EE engine 406. Once again, however, the underlying principles of the invention are not limited to the J2EE standard.

The components 806 may be used to implement various functionalities of the applications of the J2EE engine 406. The containers 804 may be used for execution of the components 806, and may be further used as an interface between the components 806 and the connectors 802.

Figure 9:
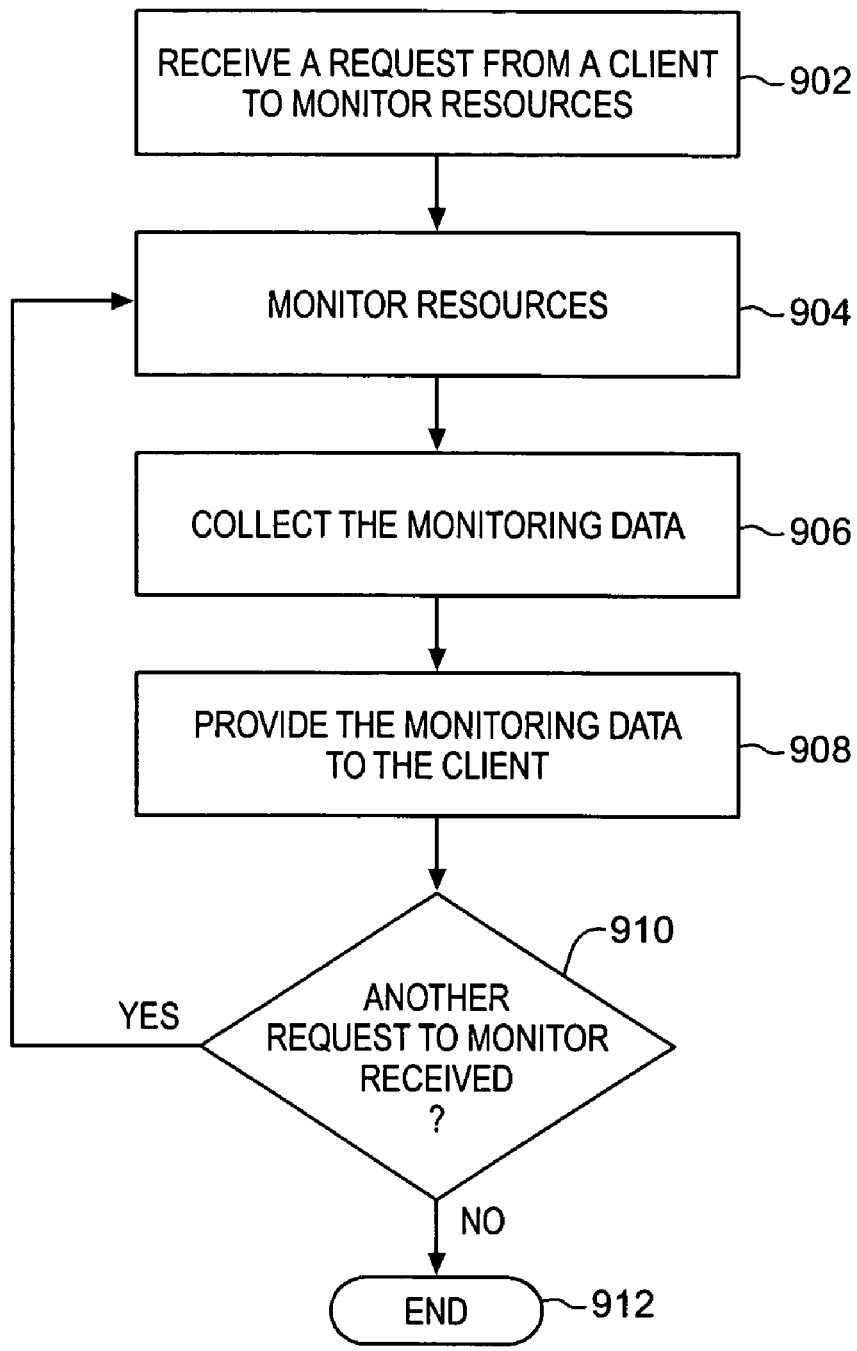
FIG. 9 is a flow diagram illustrating an embodiment of a process for Java monitoring.

FIG. 9 is a flow diagram illustrating an embodiment of a process for Java monitoring. First, according to one embodiment, a request (or command) may be received from a client to monitor various specified system resources at processing block 902. The client-side, as described with reference to FIGS. 4-6, may include various terminals from which a user or an administrator or a system may request the monitoring system to monitor the resources. For example, the request for monitoring the resources may come from a CCMS system, a visual administrator 414 and/or other third party client side applications 518.

According to one embodiment, a Java monitoring system or architecture based on Java Management Extensions (JMX) environment may be used along with a JMX monitor server (JMX monitor) to monitor the resources at processing block 904. According to one embodiment, the monitoring of the resources may include monitoring of Java resources associated with the Java 2 Platform, Enterprise Edition (J2EE) engine. Although, as mentioned above, the underlying principles of the invention are not limited to any particular standard. The monitoring of the resources, according to one embodiment, may be performed by, for example, the JMX monitor and its registered Managed Beans (beans) using a Managed Beans server (bean server). According to one embodiment, the JMX may be used as a protocol within the J2EE engine for administering, managing, and monitoring of the various resources associated with the J2EE engine.

According to one embodiment, the monitoring data from the monitoring of the resources may then be collected using various bean servers and storages at processing block 906. At processing block 908, the monitoring data may then be provided to the clients at various destinations, such as the CCMS, administrative tools, and third party tools. According to one embodiment, the monitoring data received at the client destinations may then be displayed using a monitor viewer that is part of a visual administrator or a GUI-based monitor viewer. Furthermore, according to one embodiment, one of the destinations, such as a file system, may be used to store the monitoring data to be transmitted to and used by another destination later. The file system may be an independent destination or be part of the administrative tools or the third party tools.

At decision block 910, a determination is made as to whether additional requests for monitoring have been received. According to one embodiment, monitoring of the resources may be conducted in response to the requests for monitoring received from one or more clients at various destinations. According to another embodiment, continuous monitoring of the resources may be conducted and the monitoring may be terminated or paused at the occurrence of one or more factors, such as newly added resources, re-monitoring of already monitored resources, triggering of a predetermined time period, and the like. If additional requests for the monitoring are received, the monitoring of the resources may continue at processing block 904. If no more monitoring is to be performed, the monitoring of the resources may end at processing block 912.

Figure 10:
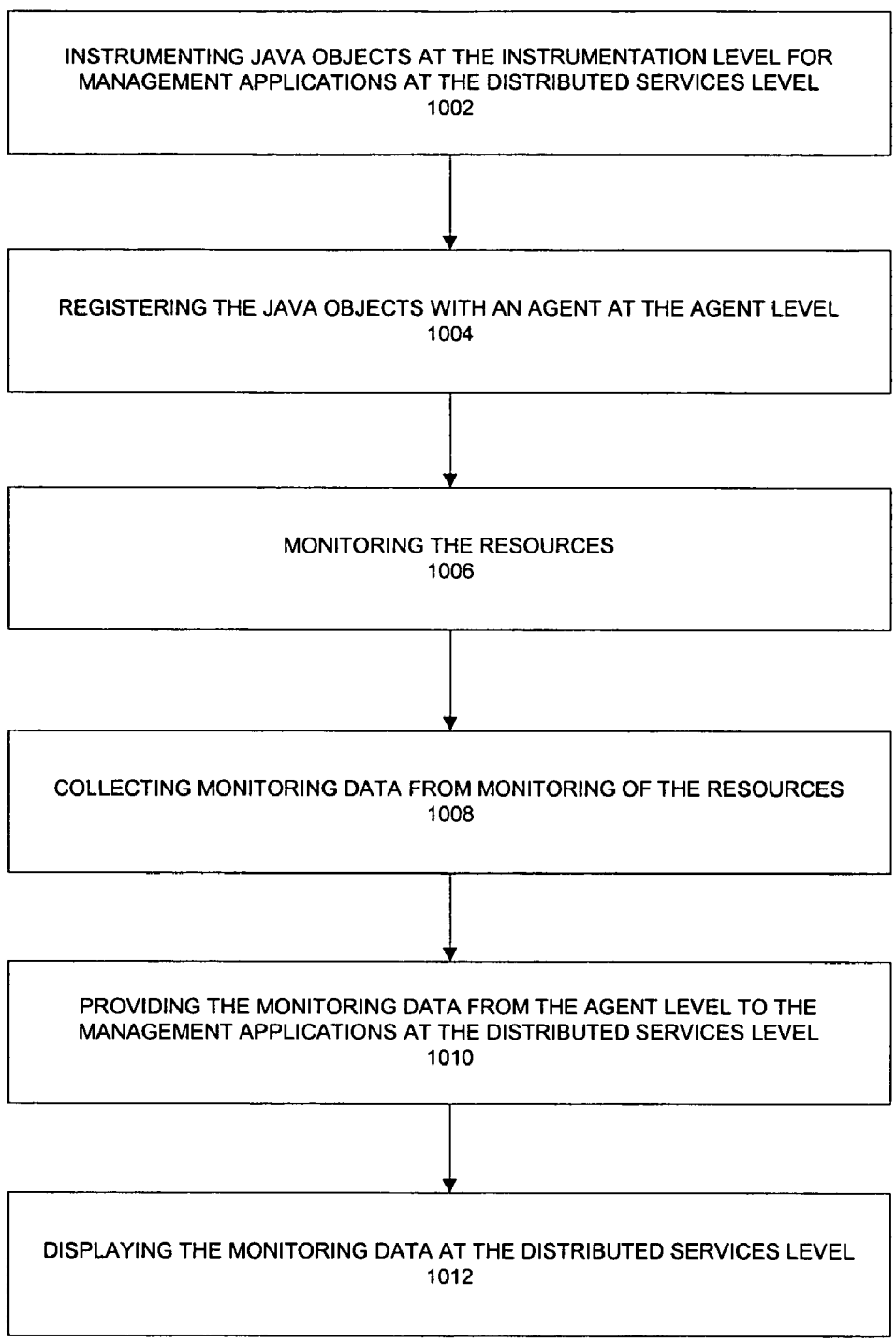
FIG. 10 is a flow diagram illustrating an embodiment of a process for Java monitoring.

FIG. 10 is a process for Java monitoring employed in one embodiment with the invention. According to one embodiment, as described with reference to FIGS. 3, 4, and 6, a JMX based monitoring architecture may be used for monitoring of resources within an application server engine. As described with reference to FIG. 3, the JMX architecture may include the following three levels: (1) instrumentation level; (2) agent level; and (3) management or distribution services level.

First, at processing block 1002, Java objects (e.g., managed beans or MBeans) may be instrumented at the instrumentation level. The instrumentation of the Java objects may include making the managed beans available for various management applications at the distributed services level. At processing block 1004, the managed beans may be registered with an agent (e.g., managed bean or MBean server) at the agent level. The managed bean server may be a single registry for the managed beans and may act as a single point for calling managed beans in a uniform fashion from the management applications.

At processing block 1006, monitoring of the resources may be performed using a JMX-based monitoring server and the managed bean server and the managed beans. The monitoring data from monitoring of the resources may be collected at the agent level at processing block 1008. The monitoring data or management information may be provided from the agent level to the various management applications at the distributed services level at processing block 1010. According to one embodiment, the monitoring data may be received at the distributed services level, at processing block 1012. At processing block 1014, the monitoring data may be displayed at the distributed services level using a monitor viewer.

Figure 11:
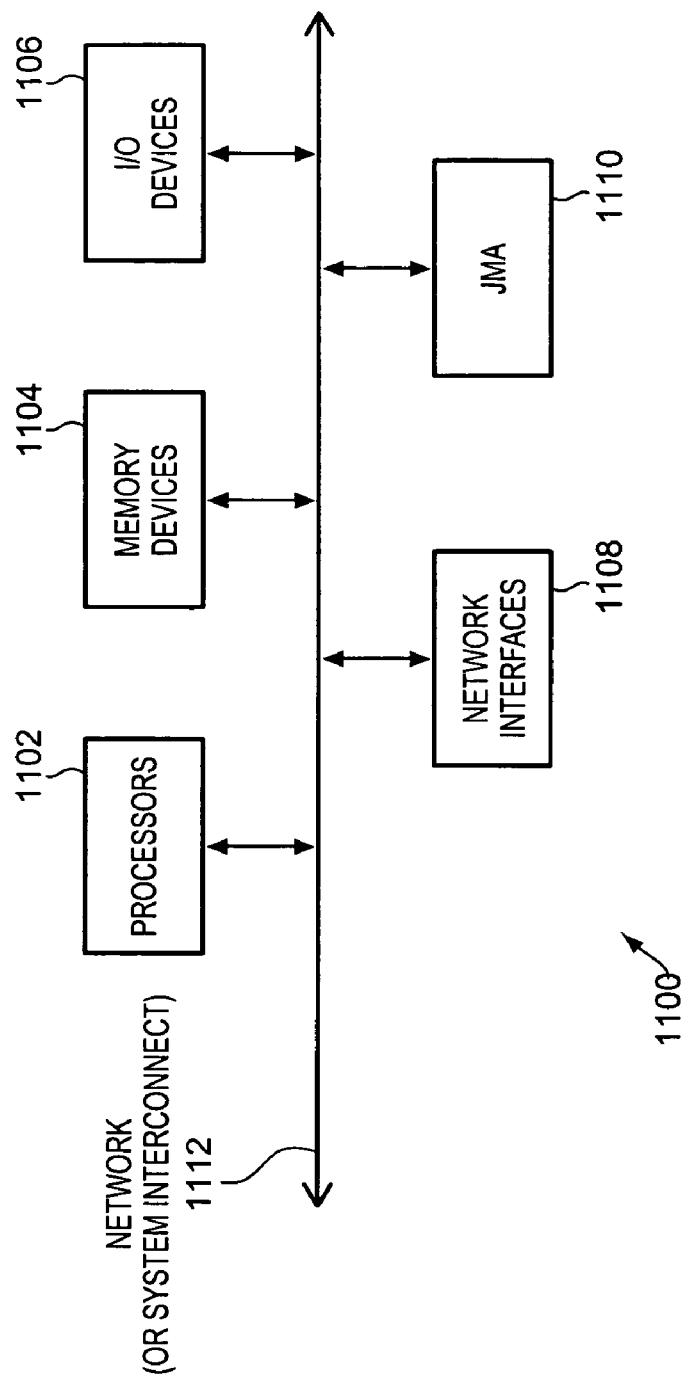
FIG. 11 is a block diagram illustrating an embodiment of a node implementation.

FIG. 11 is a block diagram illustrating an embodiment of a node implementation. According to one embodiment, the node 1100 may include one or more processors 1102 (e.g., processors 202-206 of FIG. 2), one or more memory devices 1104 (e.g., main memory 216 of FIG. 2), one or more Input/Output (I/O) devices 1106 (e.g., I/O devices 230 of FIG. 2), one or more network interfaces 1108, and Java monitoring system or architecture (JMA) 1110 (e.g., JMA 400 and 600 of FIGS. 4 and 6, respectively), directly or indirectly, connected together through a system interconnect or network 1112. The processors 1102 may include microprocessors, microcontrollers, field programmable gate arrays ("FPGAs"), application specific integrated circuits ("ASICs"), central processing units ("CPUs"), programmable logic devices ("PLDs"), and similar devices that access instructions from a system storage (e.g., memory 1104), decode them, and execute those instructions by performing arithmetic and logical operations.

The JMA 1110 may be used for monitoring of Java resource and components associated with, for example, a Java 2 Platform, Enterprise Edition (J2EE) engine. Components for monitoring of the Java resources using the JMA 1110 may include executable content, control logic (e.g., ASIC, PLD, FPGA, etc.), firmware, or some combination thereof, in one embodiment of the present invention. In embodiments of the invention in which Java monitoring may include executable content, it may be stored in the memory device 1104 and executed by the control processor 1102.

Memory devices 1104 may encompass a wide variety of memory devices including read-only memory ("ROM"), erasable programmable read-only memory ("EPROM"), electrically erasable programmable read-only memory ("EEPROM"), random access memory ("RAM"), non-volatile random access memory ("NVRAM"), cache memory, flash memory, and other memory devices. Memory devices 1104 may also include one or more hard disks, floppy disks, ZIP disks, compact disks (e.g., CD-ROM), digital versatile/video disks ("DVD"), magnetic random access memory ("MRAM") devices, and other system-readable media that store instructions and/or data. Memory devices 1104 may store program modules, such as routines, programs, objects, images, data structures, program data, and other program modules that perform particular tasks or implement particular abstract data types that facilitate system use.

The I/O devices 1106 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1112 may permit communication between the various elements of node 1100. System interconnects 1112 may include a wide variety of signal lines including one or more of memory buses, peripheral buses, local buses, host buses, and bridge, optical, electrical, acoustical, and other propagated signal lines.

In one embodiment of the invention, the management techniques which are the focus of this application are used to manage resources within a cluster of server nodes. An exemplary application server architecture will now be described, followed by a detailed description of the management architecture and associated processes.

Figure 12:
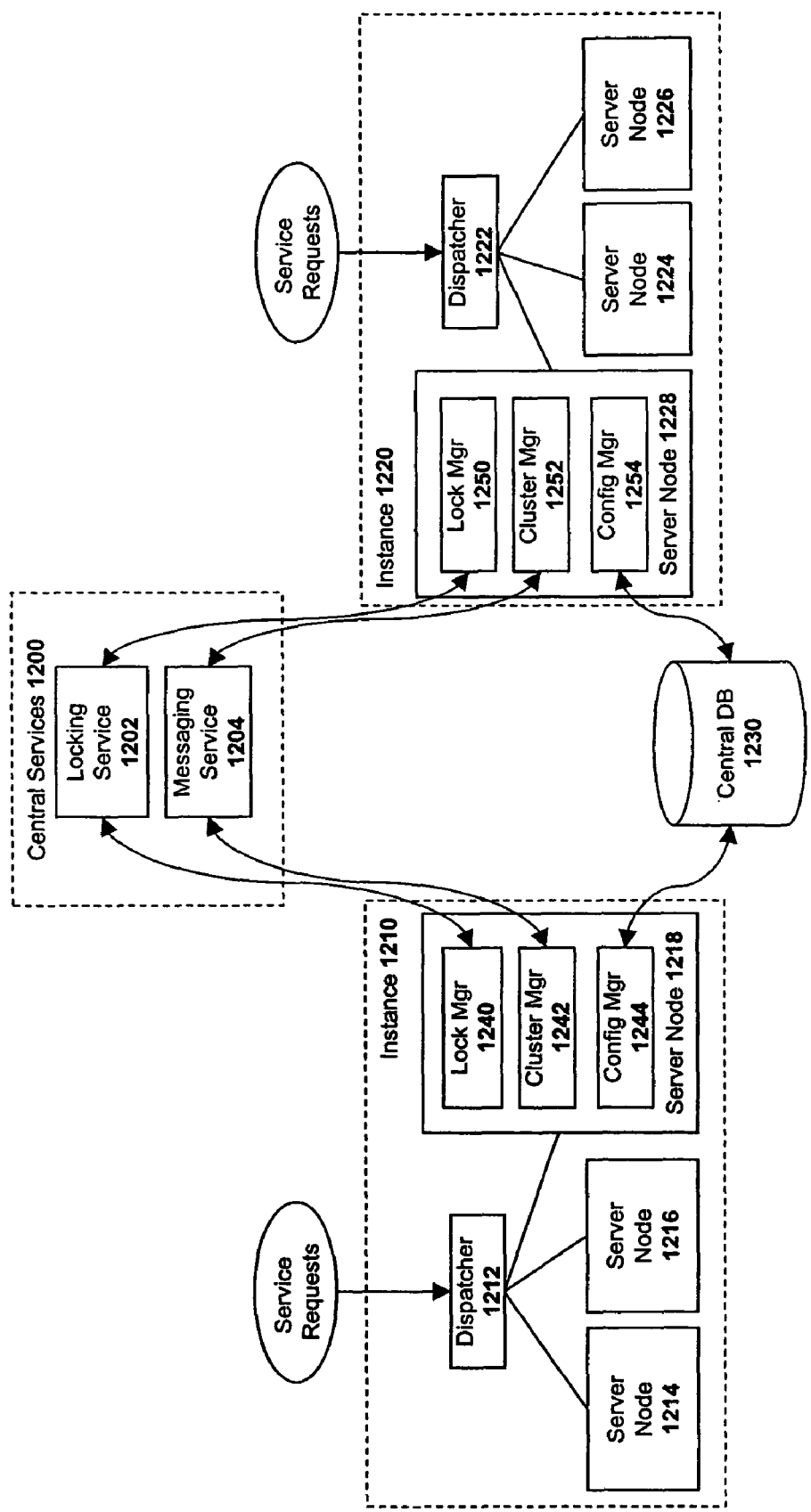
FIG. 12 is a block diagram illustrating an embodiment of an application server architecture.

An application server architecture employed in one embodiment of the invention is illustrated in FIG. 12. The architecture includes a central services "instance" 1200 and a plurality of application server "instances" 1210, 1220. As used herein, the application server instances, 1210 and 1220, each include a group of server nodes 1214, 1216, 1218 and 1224, 1226, 1228, respectively, and a dispatcher, 1212, 1222, respectively. The central services instance 1200 includes a locking service 1202 and a messaging service 1204 (described below). The combination of all of the application instances 1210, 1220 and the central services instance 1200 is referred to herein as a "cluster." Although the following description will focus solely on instance 1210 for the purpose of explanation, the same principles apply to other instances such as instance 1220.

The server nodes 1214, 1216, 1218 within instance 1210 provide the business and/or presentation logic for the network applications supported by the system. Each of the server nodes 1214, 1216, 1218 within a particular instance 1210 may be configured with a redundant set of application logic and associated data. In one embodiment, the dispatcher 1212 distributes service requests from clients to one or more of the server nodes 1214, 1216, 1218 based on the load on each of the servers. For example, in one embodiment, a dispatcher implements a round-robin policy, of distributing service requests (although various alternate load balancing techniques may be employed).

In one embodiment of the invention, the server nodes 1214, 1216, 1218 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ASAP") platforms developed by SAP AG, the assignee of the present application.

In one embodiment, communication and synchronization between each of the instances 1210, 1220 is enabled via the central services instance 1200. As illustrated in FIG. 12, the central services instance 1200 includes a messaging service 1204 and a locking service 1202. The message service 1204 allows each of the servers within each of the instances to communicate with one another via a message passing protocol. For example, messages from one server may be broadcast to all other servers within the cluster via the messaging service 1204. In addition, messages may be addressed directly to specific servers within the cluster (i.e., rather than being broadcast to all servers).

In one embodiment, the locking service 1202 disables access to (i.e., locks) certain specified portions of configuration data and/or program code stored within a central database 1230. A locking manager 1240, 1250 employed within the server nodes locks data on behalf of various system components which need to synchronize access to specific types of data and program code (e.g., such as the configuration managers 1244, 1254 illustrated in FIG. 12). As described in detail below, in one embodiment, the locking service 1202 enables a distributed caching architecture for caching copies of server/dispatcher configuration data.

In one embodiment, the messaging service 1204 and the locking service 1202 are each implemented on dedicated servers. However, the messaging service 1204 and the locking service 1202 may be implemented on a single server or across multiple servers while still complying with the underlying principles of the invention.

As illustrated in FIG. 12, each server node (e.g., 1218, 1228) includes a lock manager 1240, 1250 for communicating with the locking service 1202; a cluster manager 1242, 1252 for communicating with the messaging service 1204; and a configuration manager 1244, 1254 for communicating with a central database 1230 (e.g., to store/retrieve configuration data). Although the lock manager 1240, 1250, cluster manager 1242, 1252 and configuration manager 1244, 1254 are illustrated with respect to particular server nodes, 1218 and 1228, in FIG. 12, each of the server nodes 1214, 1216, 1224 and 1226 and/or on the dispatchers 1212, 1222 may be equipped with equivalent lock managers, cluster managers and configuration managers.

Figure 13:
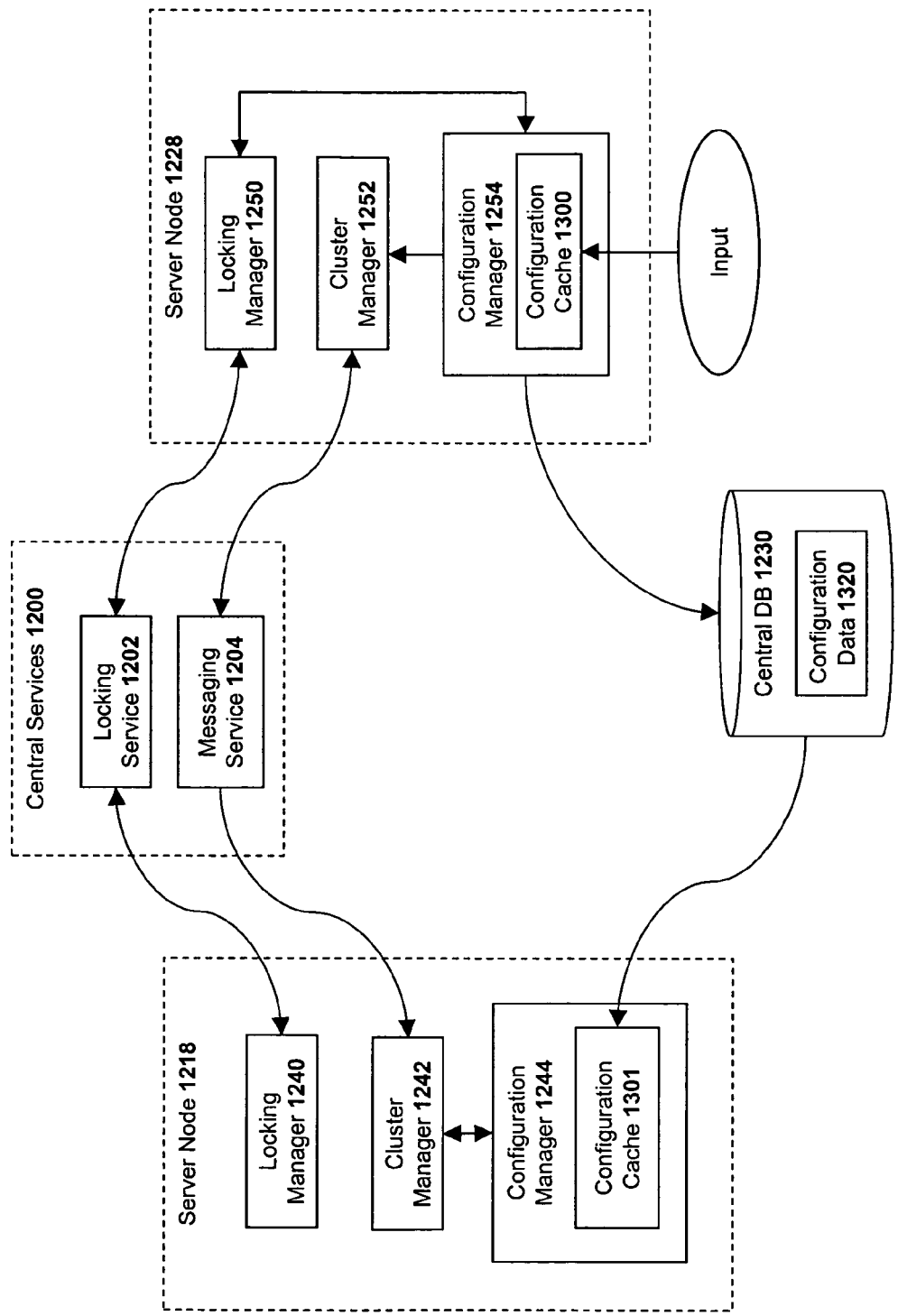
FIG. 13 is a block diagram illustrating an embodiment of an application server architecture.

Referring now to FIG. 13, in one embodiment, configuration data 1320 defining the configuration of the central services instance 1200 and/or the server nodes and dispatchers within instances 1210 and 1220, is stored within the central database 1230. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc); information related to the network management configuration for each server/dispatcher (e.g., as described below); and various other types of information related to the cluster.

In one embodiment of the invention, to improve the speed at which the servers and dispatchers access the configuration data, the configuration managers 1244, 1254 cache configuration data locally within configuration caches 1300, 1301. As such, to ensure that the configuration data within the configuration caches 1300, 1301 remains up-to-date, the configuration managers 1244, 1254 may implement cache synchronization policies.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising: registering a plurality of managed beans with a managed bean server at a runtime system of each of a plurality of application servers of a clustered computer system, the plurality of managed beans associated with a plurality of Java Management Extension (JMX) monitors, the plurality of JMX monitors managed by a single monitoring server operating within the clustered computer system; monitoring system resources via the plurality of managed beans, the plurality of managed beans to collect monitoring data relating to the system resources; providing the monitoring data to the plurality of JMX monitors such that each managed bean of the plurality of managed beans is to provide a portion of the monitoring data to its associated JMX monitor of the plurality of JMX monitors; collecting the monitoring data, via the single monitoring server, from the JMX monitors; and displaying the monitoring data via a display device coupled with the clustered computer system.

2. The method of claim 1, wherein the system resources include Java resources associated with a Java 2 Platform, Enterprise Edition (J2EE) engine, or Advanced Business Application Programming (ABAP) resources associated with an ABAP engine.

3. The method of claim 2, wherein the system resources include one or more of kernel, services, interfaces, libraries, and sessions.

4. The method of claim 1, wherein the display device comprises a monitor viewing system including a monitor viewer having one or more of a customized visual administrator monitor viewer, a Web-based monitor viewer, and a Graphical User Interface (GUI)-based monitor viewer.

5. The method of claim 1, furthering including connecting the monitor server to a management application through a distributed services level interface.

6. The method of claim 5, wherein the connecting to the management application includes communication via the distributed services level interface using at least one of a protocol adapter or a connector;

wherein the protocol adapter listens for incoming messages constructed in a particular protocol and the connector includes two components, a first component on the bean server and a second component on the management application.

7. The method of claim 5, wherein the management application includes at least one of: a computer center management system; a file system; or a visual administration application.

8. A system comprising: a computer system including a plurality of application servers and a monitoring server, each of the application servers to: register a plurality of managed beans with a managed bean server within the application servers, the plurality of managed beans being registered to serve as a single point manager for monitoring system resources associated with the application servers, the plurality of managed beans associated with a plurality of Java Management Extension (JMX) monitors, the plurality of JMX monitors managed by the monitoring server operating within the computer system; monitor the system resources via the single point manager, the single point manager to collect monitoring data related to the system resources; providing the monitoring data to the plurality of JMX monitors such that each managed bean of the plurality of managed beans being represented as the single point manager to provide a portion of the monitoring data to its associated JMX monitor of the plurality of JMX monitors; and the monitoring server to collect the monitoring data from the plurality of application servers and to display the monitoring data via a display device coupled with the computer system over a network.

9. The system of claim 8, wherein the display device comprises a monitor viewing system including a monitor viewer having one or more of a customized visual administrator monitor viewer, a Web-based monitor viewer, and a Graphical User Interface (GUI)-based monitor viewer.

10. The system of claim 8, wherein the system resources include Java resources associated with a Java 2 Platform, Enterprise Edition (J2EE) engine, or Advanced Business Application Programming (ABAP) resources with an ABAP engine.

11. The system of claim 8, wherein the network comprises one or more of a wide area network, a local area network, a metropolitan area network, an intranet, and the Internet.

12. The system of claim 8, including a client computer system communicatively coupled to the computer system and running a management application to receive the monitoring data;
wherein the management application receives the monitoring data from the computer system over a distributed services interface to the monitoring server.

13. The system of claim 12, wherein the management application includes at least one of: a computer center management system; a file system; or a visual administration application.

14. The system of claim 12, wherein the distributed services interface uses at least one of a protocol adapter or a connector for communication between the management application and the monitoring server; wherein the protocol adapter listens for incoming messages constructed in a particular protocol and the connector includes two components, a first component on the bean server and a second component on the management application.

15. A non-transitory machine-readable storage medium comprising instruction which, when executed, cause a machine to: register a plurality of managed beans with a managed bean server at a runtime system of each of a plurality of application servers of a clustered computer system, the plurality of managed beans associated with a plurality of Java Management Extension (JMX) monitors, the plurality of JMX monitors managed by a single monitoring server operating within the clustered computer system; monitor the system resources via the plurality of managed beans, the plurality of managed beans to collect monitoring data relating to the system resources; providing the monitoring data to the plurality of JMX monitors such that each managed bean of the plurality of managed beans is to provide a portion of the monitoring data to its associated JMX monitor of the plurality of JMX monitors; collect the monitoring data, via the single monitoring server, from the JMX monitors; and display the monitoring data via a display device coupled with the clustered computer system.

16. The non-transitory machine-readable storage medium of claim 15, wherein the instruction which, when executed, further cause the machine to receive a request from one or more management application to initiate the monitoring of the system resources.

17. The non-transitory machine-readable storage medium of claim 15, wherein the system resources include Java resources associated with a Java 2 Platform, Enterprise Edition (J2EE) engine, or Advanced Business Application Programming (ABAP) resources associated with an ABAP engine.

18. The non-transitory machine-readable storage medium of claim 17, wherein the system resources include one or more of kernel, services, interfaces, libraries, and sessions.

* * * * *